(12) United States Patent
Ha et al.

(10) Patent No.: US 12,473,771 B2
(45) Date of Patent: Nov. 18, 2025

(54) MOTOR-OPERATED COVER DEVICE

(71) Applicant: HBPO GmbH, Lippstadt (DE)

(72) Inventors: Insoo Ha, Erwitte (DE); Andreas Fischer, Rastatt (DE)

(73) Assignee: HBPO GmbH, Lippstadt (DE)

( * ) Notice: Subject to any disclaimer, the term of this patent is extended or adjusted under 35 U.S.C. 154(b) by 282 days.

(21) Appl. No.: 18/037,091

(22) PCT Filed: Nov. 15, 2021

(86) PCT No.: PCT/EP2021/081656
§ 371 (c)(1),
(2) Date: May 16, 2023

(87) PCT Pub. No.: WO2022/101465
PCT Pub. Date: May 19, 2022

(65) Prior Publication Data
US 2024/0018821 A1   Jan. 18, 2024

(30) Foreign Application Priority Data

Nov. 16, 2020 (DE) ...................... 10 2020 130 235.5

(51) Int. Cl.
*B60L 53/16* (2019.01)
*B60S 1/62* (2006.01)
(Continued)

(52) U.S. Cl.
CPC ............ *E05F 15/635* (2015.01); *B60L 53/16* (2019.02); *B60S 1/62* (2013.01); *H01R 13/447* (2013.01);
(Continued)

(58) Field of Classification Search
None
See application file for complete search history.

(56) References Cited

U.S. PATENT DOCUMENTS 8,089,228 B2    1/2012  Ballard
9,895,985 B2 *  2/2018  Takahashi ............... B60L 53/16
(Continued)

FOREIGN PATENT DOCUMENTS

CN    111284573 A  *  6/2020  ............. B60L 53/16
DE    102015206715      10/2016
(Continued)

OTHER PUBLICATIONS

Weiterer Prüfungsbescheid [Further Notice of Examination] Dated Oct. 23, 2023 From the Deutsches Patent—und Markenamt [German Patent and Trademark Office] Re. Application No. 102020130235.5 and Its Translation Into English. (11 Pages).
(Continued)

*Primary Examiner* — Tho D Ta

(57) ABSTRACT

The invention relates to a motor-driven covering device (2) for covering and exposing a charging connection (8) arranged on the body (4) of an electric vehicle (6) with respect to a vehicle exterior (16), comprising a cover flap (10) for covering the charging connection (8) in a closed state (I), a motor (12) operatively connected to the cover flap (10) for driving an opening movement and a closing movement of the cover flap (10), a power transmission means/device (14) for transmitting a motor power of the motor (12) for carrying out the opening movement and the closing movement of the cover flap (10), guide means/element (18) for guiding the cover flap (10) along a movement path during the opening movement and the closing movement of the cover flap (10), the motor-driven covering device (2) being configured in such a manner that the cover flap (10) can be moved along the body (4) of the electric vehicle (6) in a motor-driven manner during the opening and closing movement, wherein the body (4) at least partially covers the
(Continued)

cover flap (10) with respect to the vehicle exterior (16) in an opened state (II) of the covering device (2).

19 Claims, 12 Drawing Sheets

(51) Int. Cl.
    *E05F 15/635*      (2015.01)
    *H01R 13/447*      (2006.01)
    *H01R 13/52*      (2006.01)
    *H01R 13/66*      (2006.01)
    *H01R 13/717*      (2006.01)

(52) U.S. Cl.
    CPC .... *H01R 13/5213* (2013.01); *E05Y 2201/684* (2013.01); *E05Y 2400/44* (2013.01); *E05Y 2900/53* (2013.01); *H01R 13/6683* (2013.01); *H01R 13/7175* (2013.01); *H01R 2201/26* (2013.01)

(56) References Cited

U.S. PATENT DOCUMENTS

| | | | |
|---|---|---|---|
| 10,577,845 | B2 | 3/2020 | Herczeg |
| 10,615,534 | B2 * | 4/2020 | Herczeg ............... H01R 13/447 |
| 11,458,835 | B2 | 10/2022 | Herczeg |
| 12,203,305 | B2 * | 1/2025 | Vlk .......................... B60L 53/16 |
| 2015/0231968 | A1 | 8/2015 | Dunger et al. |
| 2017/0356228 | A1 * | 12/2017 | Herczeg ................. B60K 15/05 |
| 2020/0324646 | A1 * | 10/2020 | Herczeg ................. B60L 53/16 |
| 2023/0349219 | A1 * | 11/2023 | Zhao ....................... B60L 53/16 |
| 2024/0018821 | A1 * | 1/2024 | Ha ..................... H01R 13/5213 |

FOREIGN PATENT DOCUMENTS

| | | |
|---|---|---|
| DE | 102016110869 | 12/2017 |
| DE | 102017212397 | 1/2019 |
| DE | 102019109713 | 10/2020 |

OTHER PUBLICATIONS

Prüfungsantrag [Request for Examination] Dated Jul. 9, 2023 From the Detusches Patent—und Markenamt [German Patent and Trademark Office] Re. Application No. 102020130235.5 and Its Translation Into English. (25 Pages).

\* cited by examiner

MOTOR-OPERATED COVER DEVICE

RELATED APPLICATIONS

This application is a National Phase of PCT Patent Application No. PCT/EP2021/081656 having International filing date of Nov. 15, 2021, which claims the benefit of priority of German Patent Application No. 10 2020 130 235.5 filed on Nov. 16, 2020. The contents of the above applications are all incorporated by reference as if fully set forth herein in their entirety.

FIELD AND BACKGROUND OF THE INVENTION

The present invention relates to a motor-driven covering device and a method for covering and exposing a charging connection arranged on the body of an electric vehicle with respect to a vehicle exterior, and to an electric vehicle with such a motor-driven covering device.

Covering devices for covering and exposing charging connections are known from the prior art and are used primarily in automotive technology. The disadvantage of the known devices, apart from the often-low user comfort when covering and exposing, is in particular the relatively high space requirement of electric vehicles during a charging process. The high space requirement results from the fact that the known covering devices are usually swiveled outwards when releasing charging connections and often protrude from the vehicle at a 90° angle in an open state.

The covering devices protruding from the vehicle represent an obstacle that is sometimes difficult for pedestrians to see and with which they can collide. This can result not only in personal injury but also in damage to the covering devices. In addition, the covering devices protruding from the vehicle are often the victims of vandalism, since the covering devices can easily be snapped off by a vehicle due to their unfavorable angle.

SUMMARY OF THE INVENTION

It is therefore the object of the present invention to at least partially overcome the aforementioned disadvantages of known covering devices for covering and exposing charging connections. In particular, it is the task of the invention to provide a covering device for covering and exposing a charging connection arranged on the body of an electric vehicle, which has a minimum space requirement during a charging process and at the same time offers safe charging with a high level of charging comfort.

The foregoing problem is solved by a device having the features of the independent device claim, an electric vehicle, and a method having the features of the independent method claim. Further features and details of the invention result from the subclaims, the description and the drawings. Technical features disclosed in relation to the device according to the invention also apply in connection with the electric vehicle according to the invention and the method according to the invention, and vice versa in each case, so that reference is or can always be made mutually with regard to the disclosure of the individual aspects of the invention. Useful embodiments of the invention are set out in the dependent claims.

According to the invention, a motor-driven covering device for covering and exposing a charging connection arranged on the body of an electric vehicle with respect to a vehicle exterior is provided, which comprises a cover flap for covering the charging connection in a closed state, a motor operatively connected to the cover flap for driving an opening movement and a closing movement of the cover flap, a power transmission means/device for transmitting a motor power of the motor for executing the opening movement and the closing movement of the cover flap, and guide means/element for guiding the cover flap along a movement path during the opening movement and the closing movement of the cover flap. In addition, the motor-driven covering device is configured according to the invention in such a way that the cover flap can be moved along the body of the electric vehicle in the opening and closing movement driven by the motor, wherein the body covers the cover flap at least partially with respect to the vehicle exterior in an opened state of the covering device.

The present covering device for covering and exposing a charging connection arranged on the body of an electric vehicle can be provided in particular for use in at least partially electrically operated motor vehicles. In addition to use in at least partially electrically operated passenger cars or trucks, the covering device according to the invention can also be used in other at least partially electrically operated means/methods of transport, such as forklift trucks, cranes, ships or flying objects. In particular, the covering device according to the present invention can be formed in the form of a loading flap covering device for covering and exposing a charging connection.

In the context of the invention, an electric vehicle—as already mentioned above—is also understood to mean a vehicle that can only be partially or temporarily operated electrically, such as a hybrid vehicle or the like. According to the invention, a body of the electric vehicle is understood to mean in particular the complete frame or body of a motor vehicle, comprising mudguards, rear wings, front end module, boot, bonnet and the like. For the purposes of the present invention, a charging connection is understood to mean in particular the receptacle unit for inserting a charging plug. Furthermore, according to the invention, a vehicle exterior is understood to mean in particular the environment of the electric vehicle directly adjacent to the vehicle body. Furthermore, a cover flap is understood in the context of the invention to mean in particular a flat, planar flap or plate. The cover flap may have various shapes, for example round, oval, rectangular, elliptical or similar shapes. Preferably, during an opening and closing movement, the cover flap is motor-driven and can be moved along the body of the electric vehicle perpendicular to a direction of insertion of a charging plug from a vehicle exterior into the charging connection.

Within the scope of a structurally simple and stable design/configuration of a drive of a covering device for covering and exposing a charging connection arranged on the body of an electric vehicle, it can be advantageously provided that the power transmission means/device is formed in the form of a toothed rack drive, wherein the toothed rack drive preferably has a toothed rack and gear for transmitting a motor power of the motor for carrying out the opening movement and the closing movement of the cover flap, wherein the gear in particular has an output arranged at the end for receiving the motor. Preferably, in such an embodiment, the cover flap is configured to be openable and closable along a vehicle width. The output for receiving the motor can be formed in particular as an output for a rotary actuator.

Within the scope of a structurally simple and stable design/configuration of a drive of a covering device for covering and exposing a charging connection arranged on the body of an electric vehicle, it can also be advantageously provided that the power transmission means/device is formed in the form of a toggle drive, wherein the toggle drive preferably has at least two interconnected lever elements for transmitting a motor force of the motor for executing the opening movement and the closing movement of the cover flap, wherein in particular a first lever element is directly connected to the motor and a second lever element is directly connected to the cover flap. Preferably, in such an embodiment, the cover flap is configured to be openable and closable along a vehicle height. In an arrangement of only two lever elements, the first lever element is preferably directly connected to the engine via one end and directly connected to the second lever element via the other end, whereas the second lever element is directly connected to the cover flap via one end and directly connected to the first lever element via the other end.

Furthermore, within the framework of a structurally simple and stable design/configuration of a drive of a covering device for covering and exposing a charging connection arranged on the body of an electric vehicle, it can advantageously be provided that the power transmission means/device is formed in the form of a four-bar linkage drive, wherein the four-bar drive preferably has at least two joint elements for transmitting a motor force of the motor for carrying out the opening movement and the closing movement of the cover flap, wherein in particular a first and a second joint element are connected to the cover flap and the first joint element is in engagement with the motor. Preferably, in such an embodiment, the cover flap is also configured to be openable and closable along a vehicle height.

With regard to a stable and at the same time precisely adjustable design/configuration of a motor-driven covering device, it can advantageously also be provided that the guide means/element comprise at least one guide rod, preferably a plurality of guide rods, wherein the guide rods are arranged, in particular, parallel to each other and/or parallel to the toothed rack. With regard to precise adjustability, at least two, in particular at least three guide rods can advantageously be provided.

Likewise, with regard to a stable and at the same time precisely adjustable design/configuration of a motor-driven covering device, it can be provided that the guide means/element have at least one guide rod, preferably a plurality of guide rods, wherein the guide rods are arranged, in particular, parallel to each other and/or perpendicular to the toothed rack. With regard to precise adjustability, at least two, in particular at least three guide rods can also be provided in this case.

Alternatively, or cumulatively, it is also conceivable that the guide means/element have at least two guide rails with guide grooves for guiding the guide rods and/or corresponding guide ribs, the guide rails preferably being arranged opposite one another.

Furthermore, with regard to a simple and precise adjustability of the position of a motor-driven covering device, it is conceivable that a support frame is provided for receiving the cover flap, wherein the support frame preferably comprises two guide ribs for insertion into the guide grooves of the guide rails, wherein the guide ribs are preferably arranged at the ends of the support frame.

In order to enable the cover flap to be guided behind the body during an opening movement and to be able to engage the cover flap in its end position during a closing movement, it can be advantageously further provided that the guide means/element have at least one positioning means/element for carrying out a movement of the cover flap in the direction of the body or away from the body. In this case, the executed movement can preferably be executed essentially perpendicular to the bodywork or essentially perpendicular to the opening movement and closing movement of the cover flap.

With regard to guiding the body behind or locking the cover flap in place and at the same time a structurally simple design/configuration of a motor-driven covering device, it can advantageously be provided that the positioning means/element is configured and positioned within the motor-driven covering device in such a way that the cover flap is activated by an interaction of the positioning means/element is moved with the body of the electric vehicle during an opening movement and a closing movement of the cover flap in the direction of the body or away from the body, the interaction of the positioning means/element with the body preferably pushing the positioning means/element away from the body or moving the positioning means/element towards the body includes. The positioning means/element is preferably in the form of a guide block or the like, which is moved directly or indirectly from the body towards the body or away from the body during an opening movement and a closing movement of the cover flap, in particular perpendicular to the body and/or to the opening movement and closing movement is moved, so that during an opening movement either the cover flap can be guided behind the bodywork or the cover flap can finally snap into its end position during a closing movement.

Alternatively, with regard to a rear guidance of the body or a latching of the cover flap and a simultaneously structurally simple design/configuration of a motor-driven covering device, it can be provided that the guide means/element comprise at least two positioning means/elements for carrying out a movement of the cover flap in the direction of the body or away from the body, wherein the positioning means/element are formed in the form of an angled guide of a guide groove in order to move the cover flap in the direction of the body or away from the body during an opening movement and a closing movement of the cover flap. Preferably, the angled shape of the guide groove is at least partially arranged at the end.

Furthermore, it may be advantageous if an additional control element is provided to support a movement of the cover flap in the direction of the bodywork or away from the bodywork, wherein the additional control element preferably has two recesses for the introduction of corresponding guide rods and can in particular be attached to a toothed rack. By introducing the corresponding guide rods into the control element and additionally introducing the guide rods into corresponding grooves of guide rails, a movement of the cover flap in the direction of the body or away from the body can be achieved in a simple manner.

Within the scope of a structurally simple solution of a stable, precise and reliable drive of a motor-driven covering device, it can be advantageously provided in particular according to the invention that the motor is formed in the form of an actuator, preferably in the form of a rotary actuator, for example in the form of a drive pulley.

In the context of a design/configuration of the motor-driven covering device that is as safe and durable as possible, it may further be advantageous if a seal is provided for preventing the entry of water, the seal preferably being arranged directly on the cover flap in order to seal off an air gap between the body and the cover panel with respect to the vehicle exterior in a closed state of the covering device. Preferably, the seal can be arranged, in particular squeezed, between the cover plate and a holding frame for the cover plate. Furthermore, the seal can advantageously be made of a plastic, for example silicone, polyurethane, polyvinyl chloride, polytetrafluoroethylene or rubber.

In addition, it can be advantageous within the framework of the most durable design/configuration possible and with regard to the most compact arrangement possible of the motor-operated covering device if a housing is provided to accommodate the other components of the motor-operated covering device, wherein the housing is preferably formed from a plastic, in particular in the form of a plastic injection molding. In this case, the housing can preferably be arranged directly detachably or non-detachably to the body of the electric vehicle.

In the context of the most convenient possible design/configuration of the motor-operated covering device, it can be provided in particular that a sensor is provided for detecting an opening and/or closing command for opening and/or closing the cover flap, the sensor preferably being formed in the form of a movement sensor and/or proximity sensor, in particular in the form of a capacitive sensor. Preferably, the sensor is capable of identifying a movement gesture, for example a wiping movement or the like, as an opening and/or closing command to cover or expose the subject motor-driven covering device. Likewise, the sensor can be provided, in particular with regard to an automatic charging process, for detecting a charging robot or the like, which can automatically charge a parked vehicle, for example. Also conceivable is an embodiment of a sensor that is provided, for example, for recognition of an opening and/or closing command via interaction with a smart phone or other user terminal.

In order to be able to carry out a charging process even in poor visibility conditions, it can be advantageously further provided in accordance with the invention that an illumination device is provided for illuminating a charging connection and/or for displaying information, the illumination device preferably being formed in the form of at least one, in particular a plurality of LEDs. In this case, the illumination device can in particular also illuminate the surrounding area arranged directly around the charging connection. Preferably, the switching-on process of the illumination device can be coupled with an opening or closing process of the cover flap. Furthermore, it is conceivable that the illumination device displays information, for example about a current charging state, a charging authorization, a charging process currently being carried out, a completed charging process or the like, for example via differently colored LEDs or the like.

In addition, with regard to an increase in comfort when carrying out a charging process, it can be provided that a state of charge indicator is provided for displaying a current charging status of the electric vehicle, the state of charge indicator preferably having a plurality of LEDs. In addition to simply displaying the current state of charge of the electric vehicle, additional information, such as information about charging authorization, a charging process that is currently being carried out, a completed charging process or the like, can preferably be displayed via a state of charge indicator In order to ensure accessibility to the motor-operated covering device in question even at cold temperatures below the freezing point, it can be advantageous if a de-icing means/element is provided for de-icing an at least partially frozen cover flap, the de-icing means/element preferably being in the form of an electrically operated de-icing means/element, the electrically operated de-icing means/element comprising in particular a heating means/device and/or a ventilation means/device. The heating means/device of the electrically operated de-icing means/element can advantageously be in the form of a heating coil or the like within the scope of a structurally simple design/configuration, whereas the ventilation means/device can preferably be in the form of a fan, ventilator or blower. Such ventilation means/device and/or heating means/device can, for example, be operated during an operation of an electric vehicle, preferably driven by a generator, in order to prevent freezing of the covering device during an operation of an electric vehicle.

With regard to a reliable and energy-saving guarantee of accessibility to the motor-driven covering device in question even at cold temperatures below the freezing point, it is further conceivable that a de-icing means/element is provided for de-icing an at least partially frozen cover flap, wherein the de-icing means/element is preferably formed in the form of a deformation element, in particular in the form of a deformable seal. In this case, the deformation element is preferably arranged between a cover flap and the bodywork and, in particular, in addition to de-icing, is preferably provided for preventing water from entering a loading connection from the outside of the vehicle. Advantageously, the deformation element here has a deformation zone in which the water from the environment collects and possibly freezes into ice. The covering device can preferably produce a deformation of the deformation element within the deformation zone by moving the covering device in the closing direction beyond the closed position, so that the ice located within the deformation zone is broken and icing can be released.

For the emergency opening of the present motor-operated covering device, for example in the event of a defect in the cover flap, the power transmission means/device, the guide means/element or the like, it can be further provided that an emergency unlocking means/device is provided for the emergency unlocking of the motor-operated covering device, wherein the emergency unlocking means/device is preferably formed in the form of a purely mechanically operated emergency unlocking means/device, in particular in the form of an operable cable and/or crank drive. For example, the emergency unlocking means/device may also be in the form of an accessible catch strap which can be pulled to actuate the emergency release.

It is also an object of the invention to provide an electric vehicle. In this case, the electric vehicle comprises a charging connection for inserting a charging plug and a motor-driven covering device described above. Thus, the electric vehicle according to the invention brings the same advantages as have already been described in detail with respect to the motor-driven covering device according to the invention. The charging connector can preferably be configured to accept or introduce charging plugs of European standards, such as standard type 2 plugs, CCS2 plugs, but also for charging plugs of Japanese, Chinese or American standards.

With regard to an advantageous arrangement of the charging connection, it can advantageously be provided that the charging connection is arranged in the side of the electric vehicle, preferably arranged within the mudguard or the rear wing of the electric vehicle.

Likewise, it is conceivable that the charging connection is arranged in the front area of the electric vehicle, preferably within the front-end module, in particular within the radiator grille.

It is also an object of the invention to provide a method for covering and exposing a charging port arranged on the body of an electric vehicle to a vehicle exterior, in particular by using a motor-driven covering device described above. In this case, the method according to the invention comprises the steps/stages of controlling a motor which is operatively connected to a cover flap in order to drive an opening movement and a closing movement of the cover flap, transmitting a motor power of the motor via a power transmission means/device in order to execute the opening movement and the closing movement of the cover flap, guiding the cover flap along a movement path during the opening movement and the closing movement of the cover flap by means of guide means/element, wherein the cover flap is moved along the body of the electric vehicle in the opening and closing movement by means of a motor, wherein the cover flap is at least partially covered by the body in an opened state of the covering device with respect to the vehicle exterior. Thus, the method according to the invention brings about the same advantages as have already been described in detail with respect to the motor-driven covering device according to the invention or the electric vehicle according to the invention.

With regard to a particularly convenient embodiment of the present method, it can advantageously be provided that, before a motor operatively connected to a cover flap is controlled, an opening and/or closing command for opening and/or closing the cover flap is detected by means of a sensor, the sensor preferably being formed in the form of a movement sensor and/or proximity sensor, in particular in the form of a capacitive sensor. Preferably, by means of the sensor, a movement gesture, for example a wiping movement or the like, is identified as an opening and/or closing command to cover or release the subject motor-operated covering device. Likewise, the sensor can detect a loading robot or the like that can automatically load a parked vehicle, for example. It is also conceivable that an opening and/or closing command is given by means of the sensor via interaction with a smartphone or other user terminal.

In order to either allow the cover flap to be guided behind the body during an opening movement or to allow the cover flap to engage in its end position during a closing movement, it can also be provided that during an opening and closing movement of the cover flap, a movement of the cover flap in the direction of the body or away from the body is carried out by means of a positioning element. In this case, the executed movement can preferably be executed essentially perpendicularly to the bodywork or essentially perpendicularly to the opening movement and closing movement of the cover flap.

BRIEF DESCRIPTION OF THE SEVERAL VIEWS OF THE DRAWINGS

Further advantages, features and details of the invention will be apparent from the following description, in which embodiments of the invention are described in detail with reference to the drawings. The features mentioned in the claims and in the description may be essential to the invention individually or in any combination.

Drawings

DESCRIPTION OF SPECIFIC EMBODIMENTS OF THE INVENTION

Figure 1:
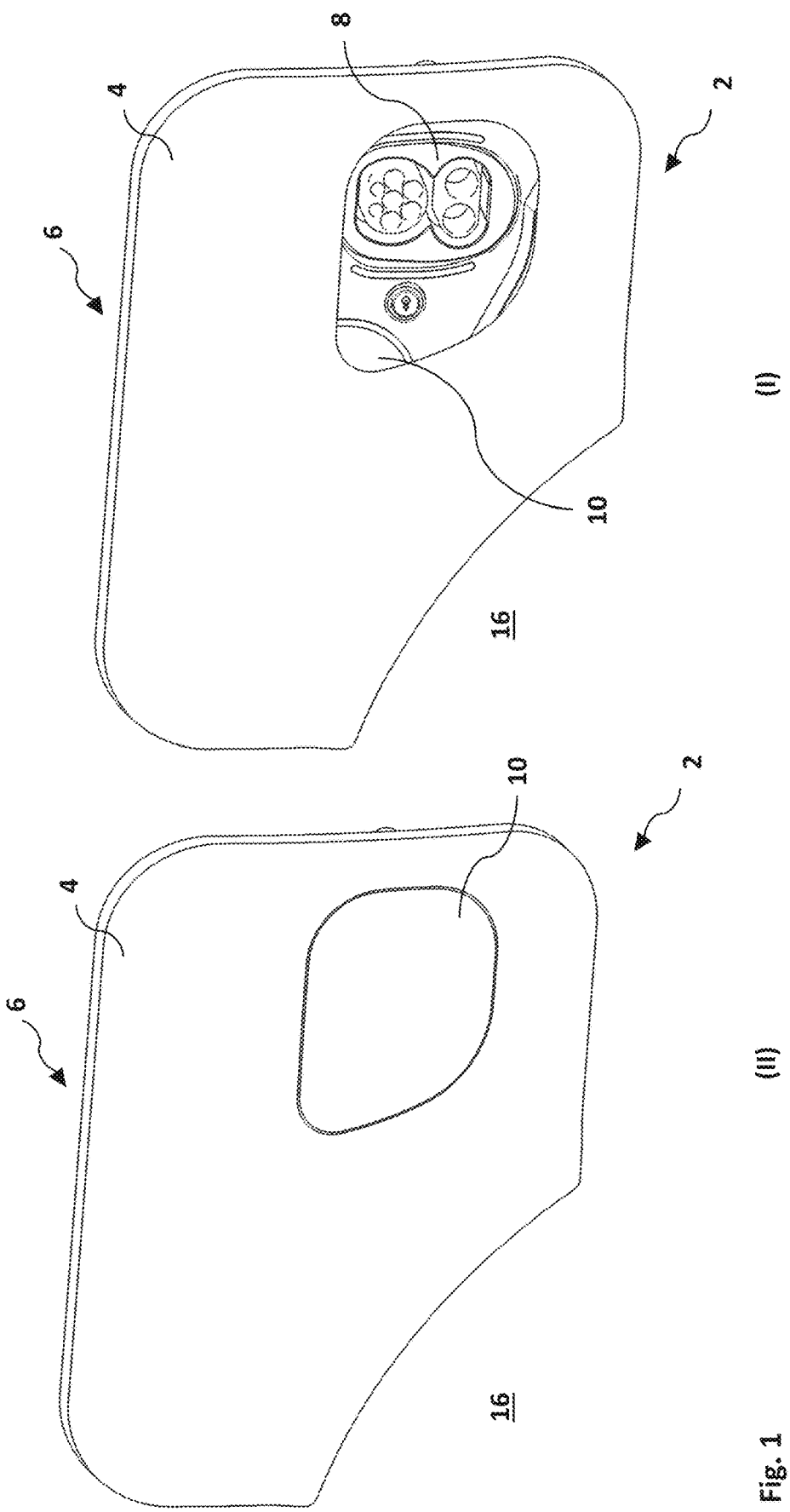
FIG. 1A schematic representation of a part of an electric vehicle according to the invention, comprising a motor-driven covering device according to the invention, FIG. 2A schematic representation of a motor-driven covering device according to the invention in accordance with a first embodiment in a closed (II) and an open state (I), FIG. 3A schematic representation of the motor-driven covering device according to the invention as shown in FIG. 2 in an exploded view, FIG. 4A schematic representation of a power transmission means/device of a motor-driven covering device according to the invention in accordance with the first embodiment, FIG. 5A further schematic representation of a power transmission means/device of a motor-driven covering device according to the invention in accordance with the first embodiment in an enlarged view, FIG. 6A schematic representation of a motor-driven covering device according to the invention in accordance with a second embodiment example in an opened state, FIG. 7A schematic representation of the motor-driven covering device according to the invention as shown in FIG. 6 in an exploded view, FIG. 8A schematic representation of the motor-driven covering device according to the invention in accordance with the second embodiment example in an enlarged view, FIG. 9A schematic representation of a motor-driven covering device according to the invention in accordance with a third embodiment in a closed state, FIG. 10A schematic representation of a sectional view of the motor-driven covering device according to the invention as shown in FIG. 9 along sectional line 111-111, FIG. 11A schematic representation of a motor-operated covering device according to the invention in a fourth embodiment in a closed (II) and an open state (I), FIG. 12A schematic representation of the individual steps/stages of a method according 20 to the invention for covering and exposing a charging connection arranged on the body of an electric vehicle.

FIG. 1 shows a schematic representation of a part of an electric vehicle (6) according to the invention, comprising a motor-driven covering device (2) according to the invention in a closed 25 (II) and an open state (I). As can be seen from FIG. 1, in a closed state (II) the cover flap (10) covers the charging connection (8) with respect to a vehicle exterior (16), whereas in an open state (I) the cover flap (10) is at least partially covered by the body (4) of the electric vehicle (6) with respect to the vehicle exterior (16).

Figure 2:
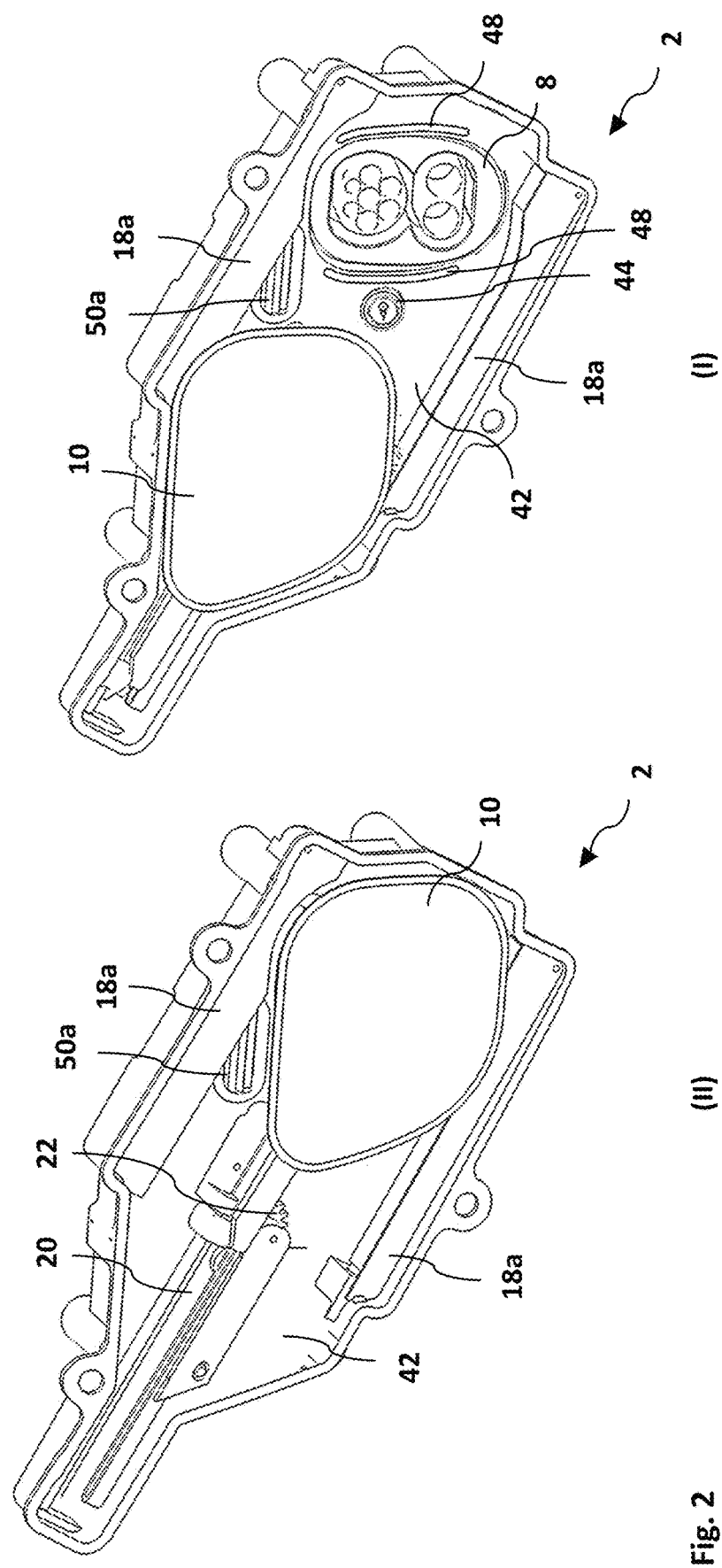

FIG. 2 shows a schematic representation of a motor-driven covering device (2) according to the 30 invention in accordance with a first embodiment example in a closed (II) and an open state (I).

As can be seen from FIG. 2, the cover flap (10) according to the first embodiment example is moved from a closed position (II) to an open position (I), in which the charging connection (8) is released, by means of a toothed rack drive comprising a toothed rack (20) and a gear (22). During this movement, the cover flap (10) is guided over the guide rods (18a). As can additionally be seen, an electrically operated de-icing means/element (50a) in the form of a fan, a sensor (44) as well as a state of charge indicator (48) for indicating a current state of charge are arranged in the housing (42) of the covering device (2).

Figure 3:
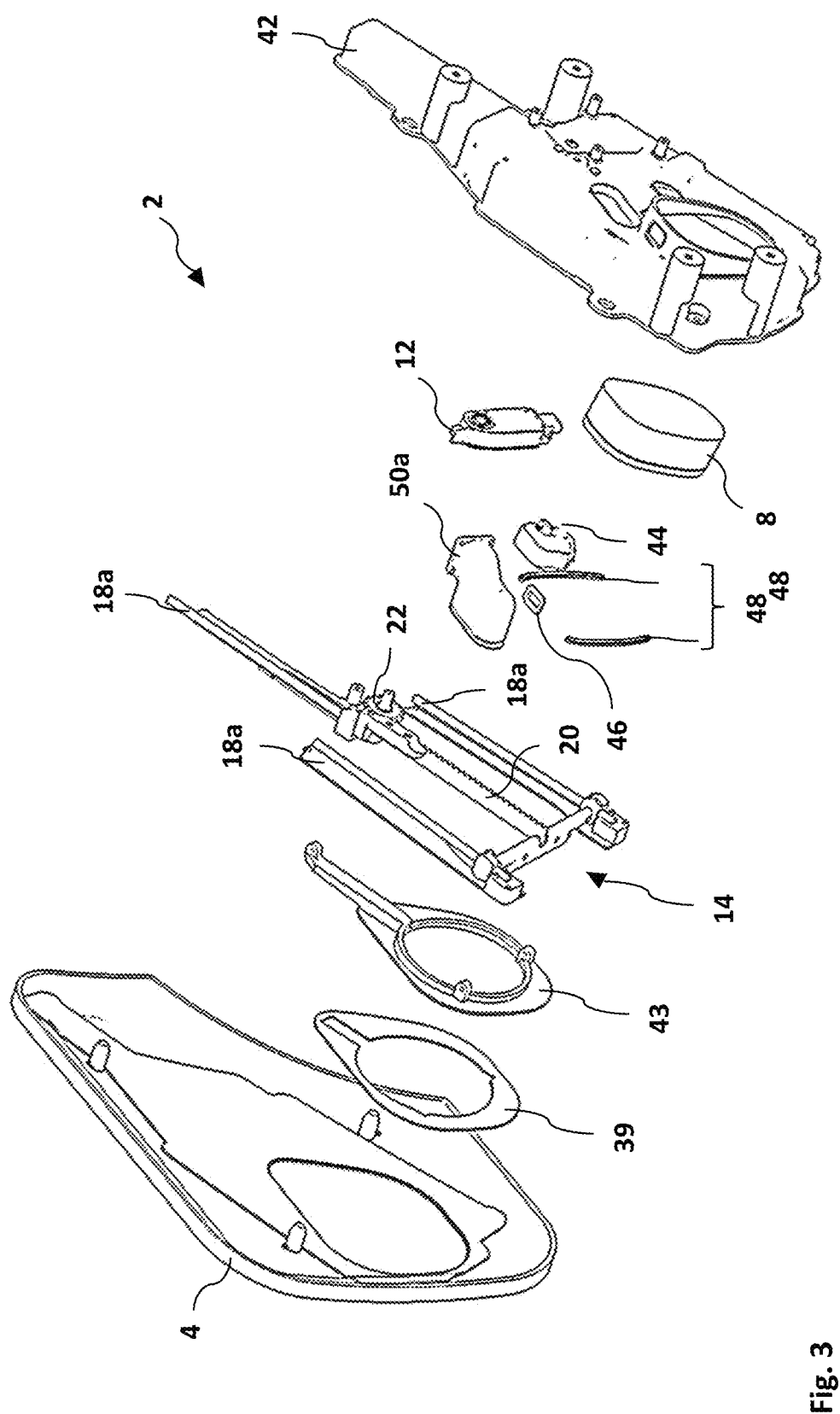

FIG. 3 shows a schematic representation of the motor-driven covering device (2) according to the invention as shown in FIG. 2 in an exploded view.

The exploded view shows in particular the structure arranged in the present case on a body (4) of an electric vehicle (6), comprising a seal (39) for preventing the entry of water, a corresponding retaining frame (43) and a power transmission means/device (14) which, according to this embodiment example, has three guide rods (18a) arranged parallel to one another for guiding the cover flap (10) along a movement path, a toothed rack (20) and a corresponding gear (22).

Furthermore, an electrically operated de-icing means/element (50a) for de-icing an at least partially frozen cover flap (10), a sensor (44) preferably in the form of a movement sensor, a state of charge indicator (48) and a motor (12) for driving an opening movement and a closing movement of the cover flap (10) are arranged. Furthermore, the motor-driven covering device (2) comprises a charging connection (8) and a closing housing (42).

Figure 4:
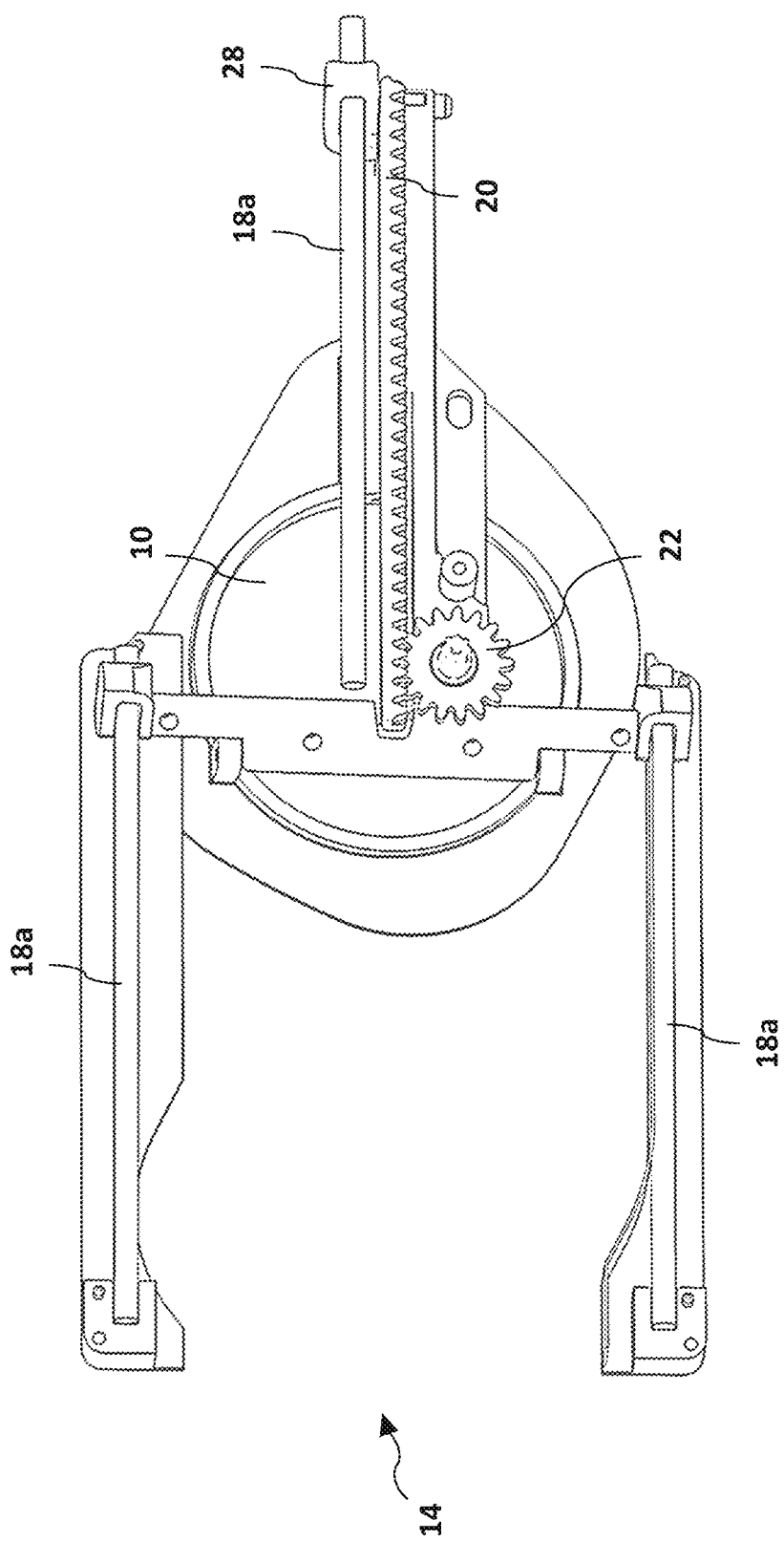

FIG. 4 shows a schematic representation of a power transmission means/device (14) of a motor-driven covering device (2) according to the first embodiment example.

As can be seen according to FIG. 4, the power transmission means/device (14) according to the first embodiment example is formed in the form of a toothed rack drive and comprises a toothed rack (20) and a gear (22) for transmitting a motor power of a motor (12) for executing the opening movement and the closing movement of the cover flap (10). For guiding the cover flap (10), according to the first embodiment example, guide means/element (18) formed in the form of guide rods (18a) are further provided for guiding the cover flap (10) along a movement path, wherein in the present case three guide rods (18a) are provided, which are arranged parallel to one another and to the toothed rack (20). A positioning means/element (28) for executing a movement of the cover flap (10) in the direction of the body (4) or away from the body (4) is also arranged at the end of the guide rod (18a) positioned close to the toothed rack (20).

Figure 5:
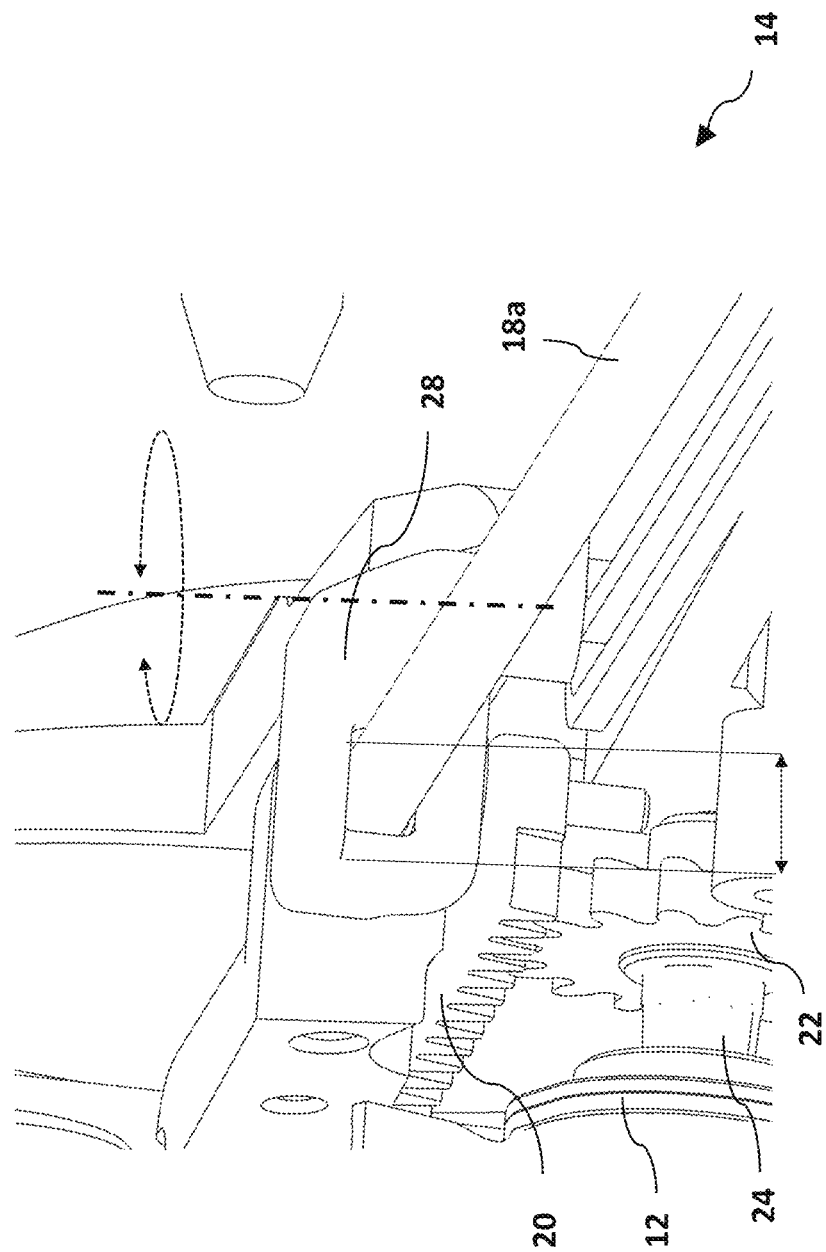

FIG. 5 shows a further schematic representation of a power transmission means/device (14) of a motor-driven covering device (2) according to the first embodiment in an enlarged view.

As can be seen in this enlarged view, the positioning means/element (28) according to the first embodiment example is configured and positioned within the motor-driven covering device (2) in such a way that the cover flap (10) is moved towards or away from the body (4) of the electric vehicle (6) by an interaction of the positioning means/element (28) with the body (4) during an opening movement and a closing movement of the cover flap (10), wherein the cooperation of the positioning means/element (28) with the body preferably comprises pushing the positioning means/element (28) away from the body (4) or moving the positioning means/element (28) towards the body (4). In addition, it can be seen from the enlarged view shown in FIG. 5 that the gear (22) has an output (24) for receiving the motor (12).

Figure 6:
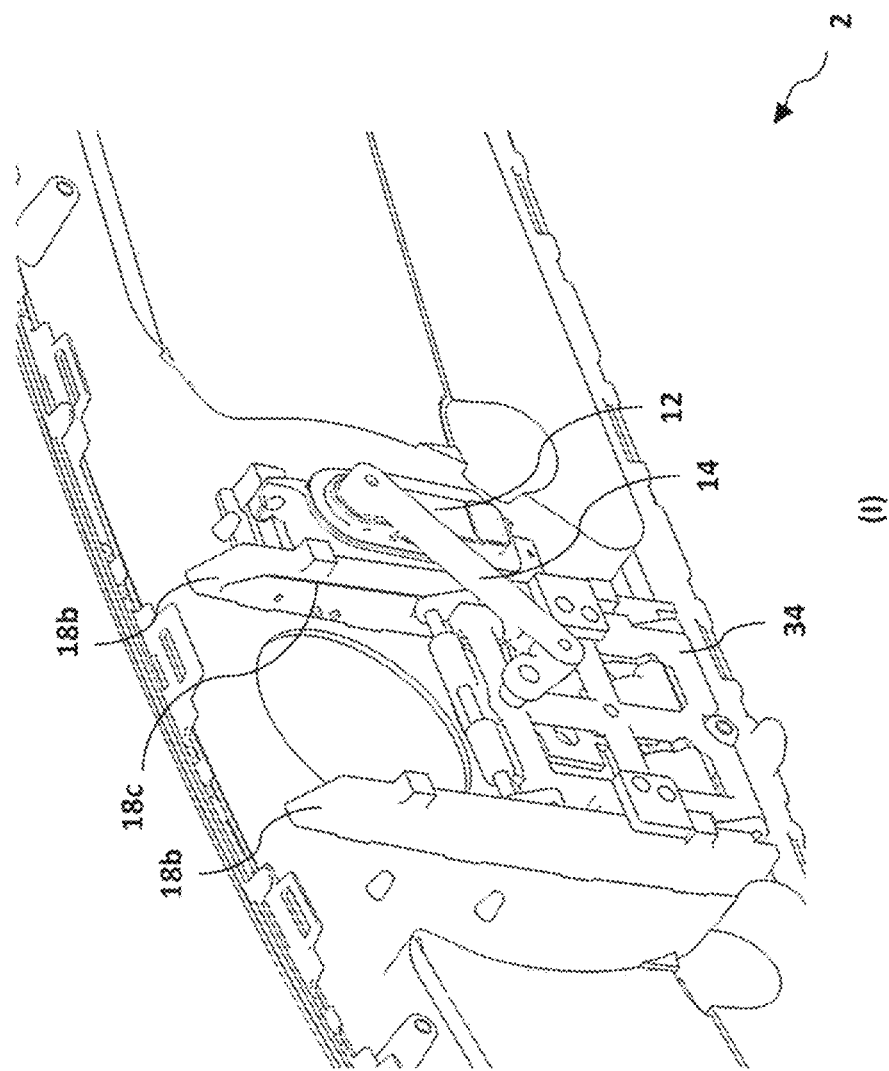

FIG. 6 shows a schematic representation of a motor-driven covering device (2) according to the invention in accordance with a second embodiment example in an open state (II).

As can be seen in FIG. 6, the motor-driven covering device (2) according to the second embodiment example is arranged in a front area, in particular behind the radiator grille of an electric vehicle (6), and is adjustable along a vehicle height. In contrast to a toothed rack drive according to the first embodiment example, the power transmission means/device (14) according to the second embodiment example is formed in the form of a toggle lever drive which transmits the motor power of the motor (12) to perform the opening movement and the closing movement of the cover flap (10). The cover flap (10) is further attached to a support frame (34), which is guided within guide grooves (18c) of guide rails (18b).

Figure 7:
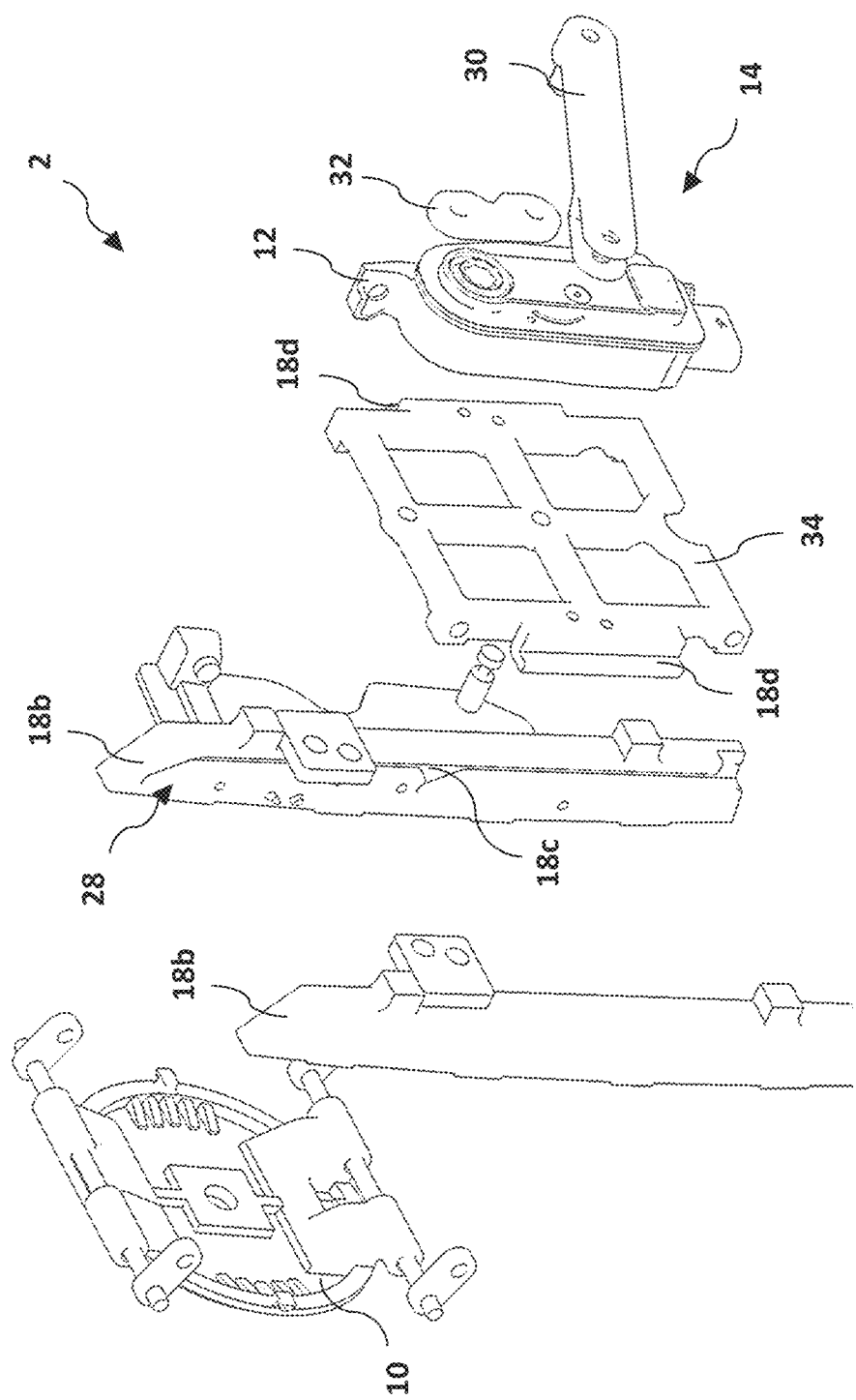

FIG. 7 shows a schematic representation of the motor-driven covering device (2) according to the invention as shown in FIG. 6 in an exploded view.

According to this exploded view, it can be seen that the power transmission means/device (14) formed according to the second embodiment example in the form of a toggle drive has two interconnected lever elements (30, 32) for transmitting a motor force of the motor (12) for executing the opening movement and the closing movement of the cover flap (10), wherein the first lever element (30) is directly connected to the motor (12) and the second lever element (32) is directly connected to the cover flap (10). During the opening and closing movement, the cover flap (10) attached to the support frame (34) is further guided in its movement along a path of movement via the guide grooves (18c) arranged in the guide rails (18b) for receiving the guide ribs (18d) of the support frame (34).

Figure 8:
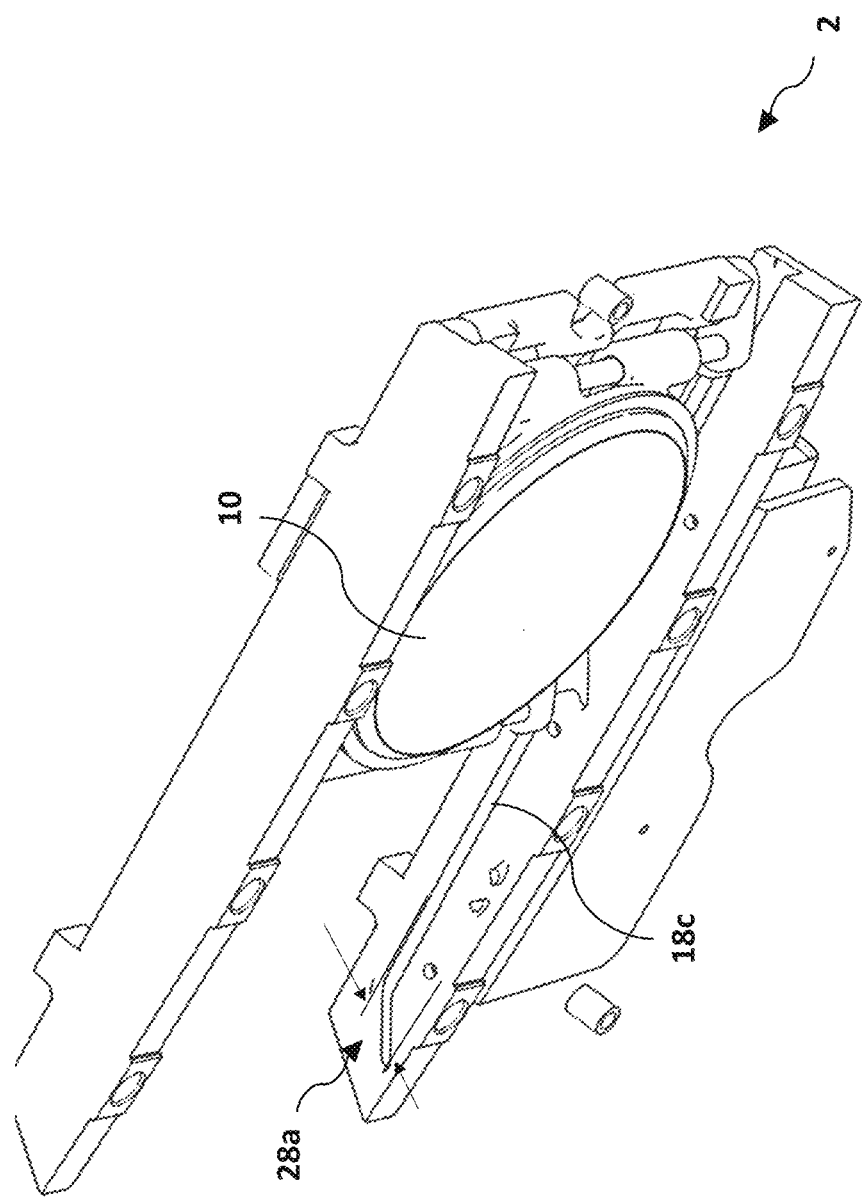

FIG. 8 shows a schematic representation of the motor-operated covering device (2) according to the invention in accordance with the second embodiment example in an enlarged view.

As can be seen according to FIG. 8, the guide groove (18c) for guiding the cover flap (10) has a positioning means/element (28), in the present case arranged at the end, for carrying out a movement of the cover flap (10) in the direction of the body (4) or away from the body (4), the positioning means/element (28) is in the present case formed in the form of an angled guide (28a), in order to move the cover flap (10) in the direction of the body (4) or away from the body (4) during an opening movement and a closing movement of the cover flap (10).

Figure 9:
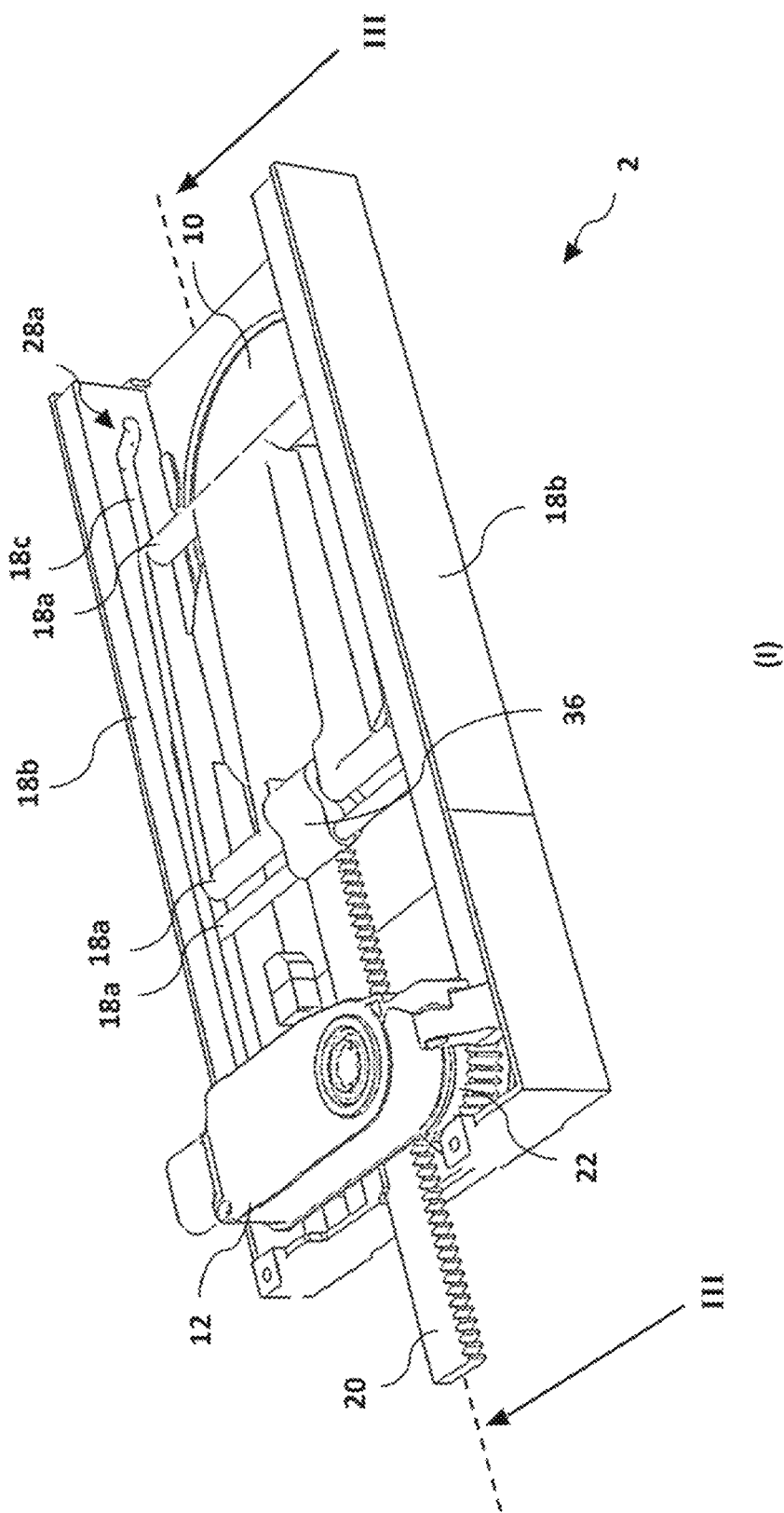

FIG. 9 shows a schematic representation of a motor-driven covering device (2) according to the invention in accordance with a third embodiment in a closed state (I).

As can be seen according to FIG. 9, the motor-driven covering device (2) according to the third embodiment example also comprises a toothed rack drive consisting of a toothed rack (20) and gear (22) for transmitting a motor power of the motor (12) for performing the opening movement and the closing movement of the cover flap (10). Furthermore, according to the third embodiment example, the covering device (2) also comprises three guide rods (18a) arranged parallel to each other, but arranged perpendicular to the toothed rack (20) rather than parallel to the toothed rack (20). Furthermore, the covering device (2) according to the third embodiment example also comprises two guide rails (18b) with guide grooves (18c) and a positioning means/element (28) arranged inside the guide groove (18c) in the form of an angled guide (28a). Finally, the covering device (2) according to the third embodiment example also comprises an additional control element (36) for supporting a movement of the cover flap (10) in the direction of the body (4) or away from the body (4), which has two recesses for the insertion of corresponding guide rods (18a) and is attached to the toothed rack (20).

Figure 10:
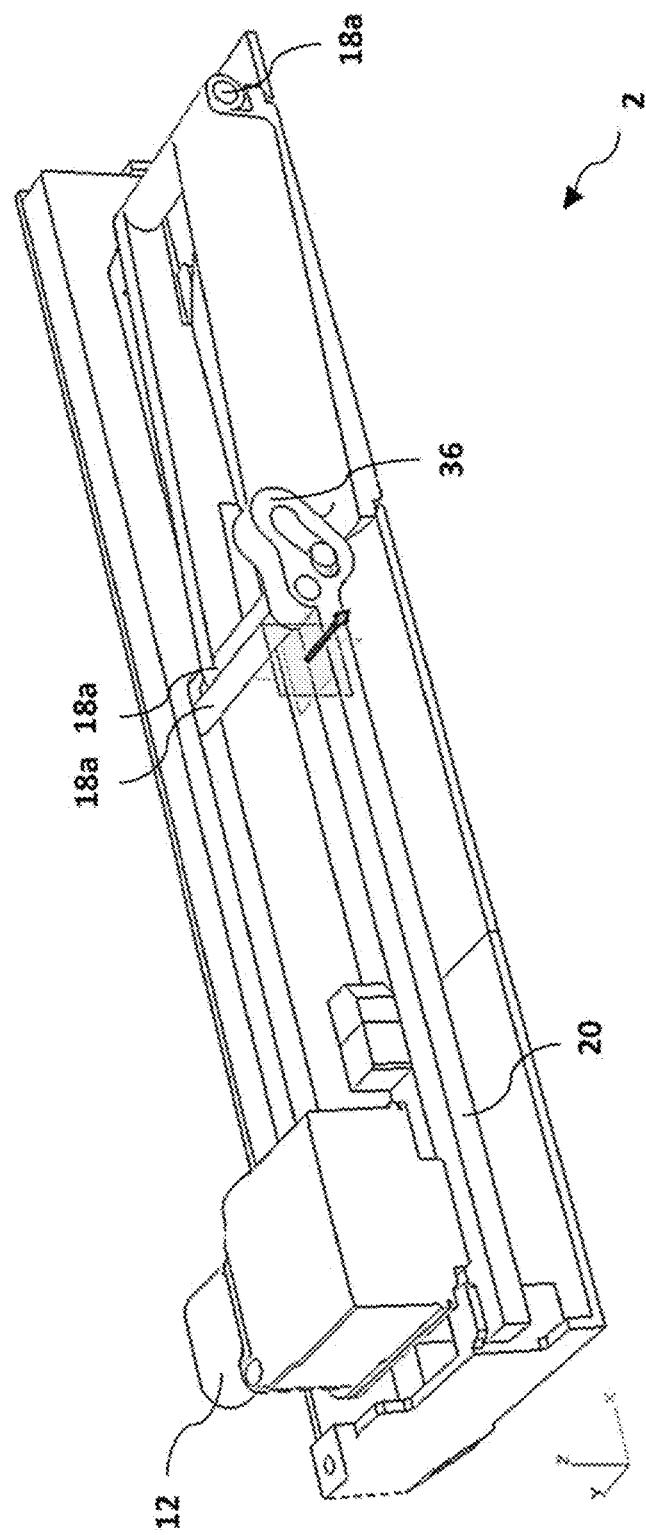

FIG. 10 shows a schematic representation of a sectional view of a motor-driven covering device (2) according to the invention as shown in FIG. 9 along sectional line 111-111.

As can be seen once again more clearly according to FIG. 10, the additional control element (36) is provided for assisting a movement of the cover flap (10) in the direction of the body (4) or away from the body (4) and has 2 recesses for the insertion of corresponding guide rods (18a), which are guided in a guide groove (18c) and cooperate accordingly with the additional control element (36) to effect a movement of the cover flap (10) in the direction of the body (4) or away from the body (4).

Figure 11:
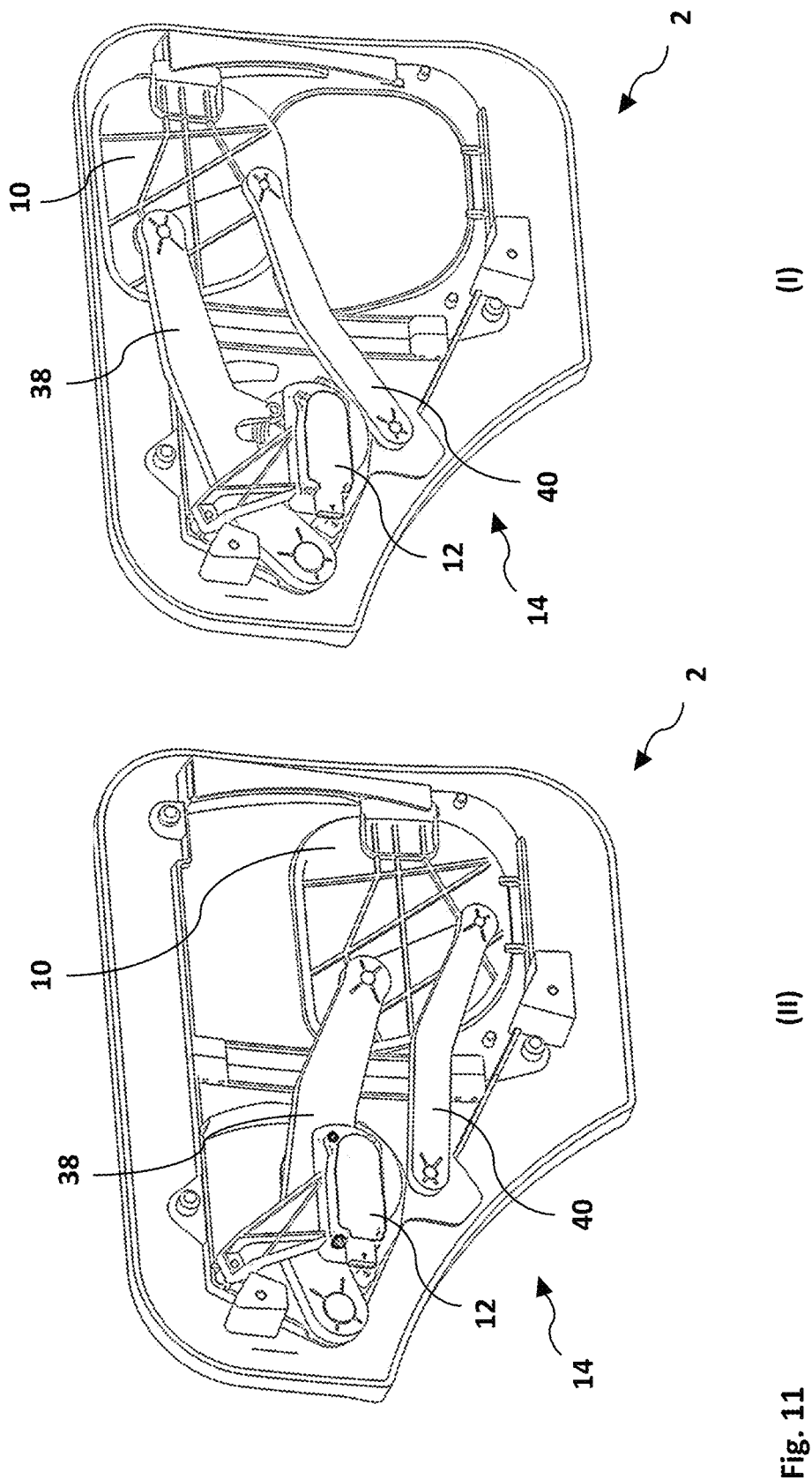

FIG. 11 shows a schematic representation of a motor-driven covering device (2) according to the invention in accordance with a fourth embodiment example in a closed (II) and an open state (I).

As can be seen according to FIG. 11, the power transmission means/device (14) according to the fourth embodiment example is formed in the form of a four-bar linkage drive, wherein the four-bar linkage drive in the present case has two joint elements (38, 40) for transmitting a motor force of the motor (12) for executing the opening movement and the closing movement of the cover flap (10), wherein the first and second linkage elements (38, 40) are connected to the cover flap (10) and the first linkage element (38) is additionally engaged with the motor (12).

Figure 12:
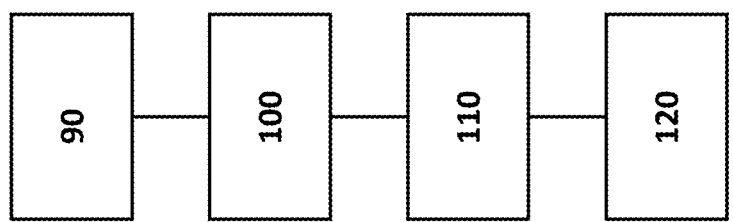

FIG. 12 shows a schematic representation of the individual steps/stages of the method according to the invention for covering and exposing a charging connection (8) arranged on the body (4) of an electric vehicle (6). Here, the method according to the invention first comprises an optional step/stage of detecting (90) an opening and/or closing command for opening and/or closing the cover flap (10) by means of a sensor (44), the step/stage of controlling (100) a motor (12) connected to the cover flap (10) for driving an opening movement and a closing movement of the cover flap (10), the step/stage of transmitting (110) a motor power of the motor (12) by means of a power transmission means/device (14) to perform the opening movement and the closing movement of the cover flap (10), and the step/stage of guiding (120) the cover flap (10) along a movement path during the opening movement and the closing movement of the cover flap (10) by means of guide means/element (18), wherein the cover flap (10) is moved along the body (4) of the electric vehicle (6) in a motor-driven manner during the opening and closing movement, wherein the cover flap (10) is at least partially covered by the body (4) with respect to the vehicle exterior (16) in an opened state (II) of the covering device (2).

By means of the motor-driven covering device according to the invention and by means of the method according to the invention, it is in particular possible to provide a covering device for covering and exposing a charging connection arranged on the body of an electric vehicle, which has a minimum space requirement during a charging process and at the same time offers safe charging and a high charging comfort.

LIST OF REFERENCE SKINS

2 Motor-driven covering device
4 Car body
6 Electric vehicle
8 Charging connection
10 Cover flap
12 Motor
14 Power transmission
16 Vehicle exterior
18 Guide means/element
18a Guide rods
18b Guide rails
18c Guide grooves
18d Guide ribs
20 toothed rack
22 Output drive
28 Positioning means/element
28a angled guide
30 first lever element
32 second lifting element
34 support frame
36 additional control element
38 first joint element
39 seal
40 second joint element
41 Air gap
42 Housing
43 Retaining frame
44 Sensor
46 Illumination device
48 State of charge indicator
50 De-icing means/element
50a Electrically operated de-icing means/element
50b Deformation element
52 Heating means/device
54 Ventilation means/device
56 Emergency unlocking means/device
90 Detecting of an opening and/or closing command
100 Controlling of a motor operatively connected to a cover flap
110 Transmitting a motor force
120 Guiding the cover flap along a movement path
I Open state
II Closed state

What is claimed is:

1. A motor-driven covering device for covering and exposing a charging connection arranged on a body of an electric vehicle with respect to a vehicle exterior, comprising:
a cover flap for covering the charging connection in a closed state,
a motor operatively connected to the cover flap for driving an opening movement and a closing movement of the cover flap,
a power transmission device for transmitting a motor power of the motor for executing the opening movement and the closing movement of the cover flap,
guide element for guiding the cover flap along a movement path during the opening movement and the closing movement of the cover flap,
wherein the motor-driven covering device is configured in such a way that the cover flap can be moved along the body of the electric vehicle in a motor-driven manner during the opening and closing movement, the body covering the cover flap at least partially with respect to the vehicle exterior in an opened state of the covering device
wherein the power transmission device is selected from a group consisting of a toothed rack drive, a toggle drive and a four-bar drive.

2. The motor-driven covering device (2) according to claim 1, wherein the power transmission device (14) is formed in the form of a four-bar drive, the four-bar drive preferably having at least two joint elements (38, 40) for transmitting a motor power of the motor (12) for carrying out the opening movement and the closing movement of the cover flap (10), in particular a first and second joint element (38, 40) being connected to the cover flap (10) and the first joint element (38) being engaged with the motor (12).

3. The motor-driven covering device according to claim 1, wherein the guide element comprise at least one guide rod.

4. The motor-driven covering device according to claim 1, wherein the guide element comprises at least two guide rails with guide grooves for at least guiding guide rods or corresponding guide ribs.

5. The motor-driven covering device according to claim 1, wherein a support frame is provided for receiving the cover flap.

6. The motor-driven covering device according to claim 1, wherein the guide element comprise at least two positioning device for performing a movement of the cover flap towards the body or away from the body, wherein the at least two positioning device are formed in the form of an angled guide of a guide groove for moving the cover flap towards the body or away from the body during an opening movement and a closing movement of the cover flap or wherein an additional control element is provided for assisting a movement of the cover flap in the direction of the bodywork or away from the bodywork.

7. The motor-driven covering device according to claim 1, wherein the motor is formed in the form of an actuator.

8. The motor-driven covering device according to claim 1, wherein a seal is provided for preventing the entry of water.

9. The motor-driven covering device according to claim 1, wherein a housing is provided for accommodating other components of the motor-operated covering device.

10. The motor-driven covering device according to claim 1, wherein a sensor is provided for at least detecting an opening or closing command for at least opening or closing the cover flap.

11. The motor-driven covering device according to claim 1, wherein an illumination device is provided for at least illuminating a charging connection or for displaying information or wherein a state of charge indicator is provided for indicating a current state of charge of the electric vehicle.

12. The motor-driven covering device according to claim 1, wherein a de-icing element is provided for de-icing an at least partially frozen cover flap.

13. The motor-driven covering device according to claim 1, wherein an emergency unlocking device is provided for emergency unlocking of the motor-operated covering device.

14. The motor-driven covering device according to claim 1, wherein the guide element comprises at least one positioning device for performing a movement of the cover flap towards the body or away from the body.

15. The motor-driven covering device according to claim 12, wherein the at least one positioning device is configured and positioned within the motor-driven covering device such that the cover flap is moved towards the body or away from the body by an interaction of the at least one positioning device with the body of the electric vehicle during an opening movement and a closing movement of the cover flap.

16. An electric vehicle comprising a charging connection for insertion of a charging plug and a motor-driven charging plug and a motor-driven covering device according to claim 1.

17. The electric vehicle according to claim 16, wherein the charging connection is arranged in the side of the electric vehicle, or wherein the charging connection is arranged in the front region of the electric vehicle.

18. A method for covering and exposing a charging connection arranged on the body of an electric vehicle with respect to a vehicle exterior, using a motor-driven covering device according to claim 1, comprising:
   controlling a motor operatively connected to a cover flap for driving an opening movement and a closing movement of the cover flap,
   transmitting a motor power of the motor via a power transmission device for carrying out the opening movement and the closing movement of the cover flap,
   guiding the cover flap along a movement path during the opening movement and the closing movement of the cover flap by means of guide element,
wherein
the cover flap is moved along the body of the electric vehicle in a motor-driven manner during the opening and closing movement, the cover flap being at least partially covered by the body with respect to the vehicle exterior in an open state of the covering device;
wherein the power transmission device is selected from a group consisting of a toothed rack drive, a toggle drive and a four-bar drive.

19. The method according to claim 18, wherein, before a motor which is operatively connected to a cover flap is controlled, at least an opening or closing command for at least opening or closing the cover flap is detected by means of a sensor or wherein during an opening and closing movement of the cover flap, a movement of the cover flap in the direction of the bodywork or away from the bodywork is carried out by means of a positioning element.

* * * * *